Nov. 21, 1944.
H. L. STASSE
2,363,157
PROCESS FOR PURIFYING PIPERIDINE
Filed May 8, 1943
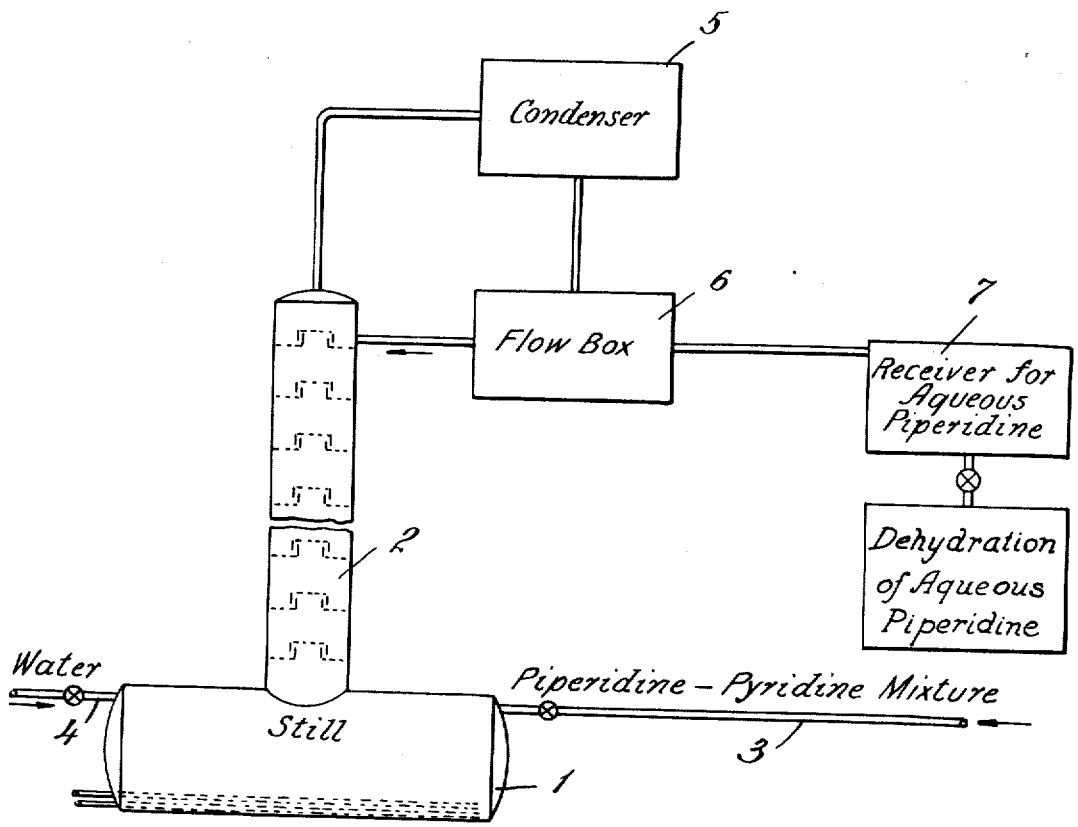
INVENTOR.
Henry L. Stasse
BY
Gordon A. Wilkins
ATTORNEY Patented Nov. 21, 1944

2,363,157

UNITED STATES PATENT OFFICE 2,363,157

PROCESS FOR PURIFYING PIPERIDINE

Henry L. Stasse, Hawthorne, N. J., assignor to Allied Chemical & Dye Corporation, New York, N. Y., a corporation of New York Application May 8, 1943, Serial No. 486,253

8 Claims. (Cl. 202—42)

This invention pertains to the separation of piperidine from pyridine and more particularly to fractional distillation of mixtures containing piperidine and pyridine.

In the production of piperidine by hydrogenation of pyridine, reaction mixtures constituted predominantly of piperidine and containing substantial proportions, e. g. 5 to 20 per cent by weight of pyridine and small amounts of aliphatic amines such as amylamine and high boiling bases which probably include dipiperidyls, are frequently obtained. While pure piperidine boils at about 105.8° C. and pure pyridine boils at about 115.3° C., complete separation of these materials cannot be accomplished by ordinary fractional distillation because they form a constant boiling mixture containing not over about 92 per cent by weight of piperidine and at least 8 per cent of pyridine boiling at about 106.1° C. at atmospheric pressure (760 mm. of mercury). Hence, it is not feasible to obtain piperidine of more than about 92 per cent purity from piperidine-pyridine mixtures containing larger percentages of pyridine by conventional fractional distillation processes.

It is an object of this invention to provide a distillation process for the recovery from piperidine-pyridine mixtures of piperidine of lower pyridine content than is obtainable by conventional fractional distillation of the mixtures.

It is a further object of the invention to provide an economical process for azeotropically distilling piperidine-pyridine mixtures so as to obtain piperidine containing a reduced amount of pyridine as distillate, leaving pyridine and higher boiling impurities as residue.

It is another object of the invention to provide a process of azeotropically distilling piperidine-pyridine mixtures which produces a high yield of piperidine of relatively low pyridine content. Other objects and advantages will appear hereinafter.

In accordance with the invention mixtures containing piperidine and pyridine are subjected to azeotropic fractional distillation in the presence of water. By utilizing piperidine-pyridine mixtures containing between 6 and 12 parts by weight of piperidine to each part of pyridine high yields of azeotropic distillate containing a weight ratio of piperidine to pyridine of at least 95 to 5 may readily be obtained. Ordinarily when such mixtures are employed by the time the ratio of piperidine to pyridine in the running distillate falls below 95 to 5 more than 80 per cent by weight of the piperidine has been removed as distillate leaving most of the pyridine as residue. High boiling impurities such as dipiperidyls present in the pyridine mixture also remain in the residue. When the mixtures contain less than about 6 parts by weight of piperidine to each part of pyridine, they are preferably concentrated by non-azeotropic distillation to raise their piperidine content to at least about 85 per cent by weight prior to azeotropic distillation. Piperidine-pyridine mixtures containing materially lower amounts of piperidine than 85 per cent by weight may also be azeotropically distilled in the presence of water in accordance with the invention to obtain distillates containing weight ratios of piperidine to pyridine of at least 95 to 5. When the mixtures are low in piperidine content containing say less than 30 per cent of piperidine based on the weight of the mixture, it may be necessary to repeat the azeotropic distillation in order to obtain distillates containing a weight ratio of piperidine to pyriidne of 95 or more to 5. Ordinarily it is more economical to concentrate such mixtures by non-azeotropic fractional distillation prior to azeotropically distilling them than to subject the mixtures directly to azeotropic distillation.

The aqueous piperidine-containing distillate may be dehydrated in any conventional manner, for example, by azeotropic distillation in the presence of an azeotropic agent, such as hydrocarbons boiling within the range of about 80° to 110° C., which forms with water an azeotropic mixture boiling sufficiently below the boiling point of piperidine to permit removal of the water as azeotropic distillate without substantial loss of piperidine. Such azeotropic agents include benzene, toluene, methyl cyclohexane and hydrocarbons of petroleum origin. If desired, the aqueous piperidine-containing distillate may be further purified in accordance with the invention of my co-pending application Serial No. 486,254 filed May 8, 1943.

The accompanying drawing is a flow sheet illustrating diagrammatically an arrangement of conventional apparatus which may be employed in carrying out the invention.

In the drawing, reference numeral 1 designates a still equipped with a fractionating column 2 supplied with piperidine-pyridine mixture through valved conduit 3 and water through valved conduit 4. Condenser 5 discharges into flow box 6 arranged to return any desired proportion of the condensed distillate to column 2 as reflux and deliver the remainder to receiver 7.

The invention may be carried out by introducing 100 parts by volume of a mixture containing 85 to 92 per cent by weight of piperidine and from 15 to 8 per cent of pyridine in still 1 together with at least 50 parts by volume of water. If the mixture contains more than 15 per cent by weight of pyridine it may advantageously be fractionally distilled to reduce the pyridine content to say about 10 per cent prior to azeotropic distillation in accordance with the invention; where preliminary fractional distillation is accomplished it may be carried out so as to remove high boiling bases such as dipiperidyls from the piperidine-pyridine mixture. During the azeotropic distillation, distillate vapors are condensed in condenser 5 discharging into flow box 6 which may be set to return any desired proportion of the condensate to column 2 as reflux; ordinarily from 80 to 95 per cent by volume of the condensate is returned to the column as reflux. The azeotropic distillate is ordinarily constituted of between 31 and 33 parts by volume of water and between 67 and 69 parts by volume of bases. The proportion of piperidine to pyridine in the distillate may vary somewhat depending on the proportion of piperidine to pyridine in the still charge; for example, where the piperidine-pyridine mixture originally charged into the still contains about 89 per cent by weight of piperidine, 9.5 per cent by weight of pyridine and 1 per cent of aliphatic amines calculated as amylamine, the initial distillate will contain a weight ratio of piperidine to pyridine of about 97.3 to 2.7. When the piperidine content of the still charge is materially reduced, the ratio of piperidine to pyridine in the distillate gradually falls; by the time this ratio reaches 95 to 5 the major portion of the pyridine present in the charge remains as still residue and a relatively high yield of piperidine has been driven off as distillate.

The aqueous azeotropic distillate may be dehydrated in any suitable manner. For example, it may be distilled in the presence of azeotropic agents, such as hydrocarbons boiling within the range of about 80° to 110° C., forming with water low boiling azeotropes which distill off leaving substantially anhydrous piperidine of 96 per cent or higher purity as still residue. Examples of azeotropic agents which remove water without substantial removal of piperidine are benzene, toluene and hydrocarbons of petroleum origin. Alternatively, the aqueous water-piperidine-pyridine azeotropic distillate may be further purified to remove both water and reduce the pyridine content thereof in accordance with the invention of my application Serial No. 486,254 filed May 8, 1943.

The following example is further illustrative of the invention:

A reaction mixture obtained by hydrogenating pyridine was distilled to remove water and high boiling compounds such as dipiperidyls and 200 parts by volume of the resultant crude product containing about 89 per cent by weight of piperidine, 9.5 per cent by weight of pyridine, and 1 per cent by weight of aliphatic amines calculated as amylamine, were charged with 135 parts by volume of water into a still equipped with a fractionating column having an efficiency equal to about 18 theoretical plates. The mixture was fractionally distilled returning about 90 per cent of the distillate to the column as reflux until 235 parts by volume of distillate had been removed. Data on the distillation are given in the following table:

| Vapor temperature, °C. | Total distillate, parts by volume | | Volume ratio of $H_2O$ to bases in fraction | Weight ratio of piperidine to pyridine in fraction |
|---|---|---|---|---|
| | $H_2O$ | Bases | | |
| 92.8 | 1.6 | 3.4 | 32:68 | 97.3:2.7 |
| 92.8 | 6.6 | 13.4 | 33:67 | 97.9:2.1 |
| 92.8 | 14.6 | 30.4 | 32:68 | 97.9:2.1 |
| 92.8 | 23.6 | 51.4 | 31:69 | 97.3:2.7 |
| 92.8 | 32.6 | 72.4 | 31:69 | 97.8:2.2 |
| 92.8 | 40.6 | 89.4 | 31:69 | 97.5:2.5 |
| 92.8 | 48.6 | 106.4 | 31:69 | 96.7:3.3 |
| 92.8 | 53.3 | 116.7 | 31:69 | 95.5:4.5 |
| 92.8 | 61.3 | 133.7 | 32:68 | 96.1:3.9 |
| 92.8 | 74.0 | 161.0 | 32:68 | 95.2:4.8 |

The residue remaining in the still at this time contained about 70 per cent of the pyridine and 13 per cent of the piperidine present in the original still charge. The azeotropic distillate, which had a constant boiling point of 92.8° C. at atmospheric pressure (760 mm. of mercury) containing about 157.5 parts by volume of piperidine (including a small amount of aliphatic amines), 4.5 parts by volume of piperidine and 73 parts by volume of water. This distillate was charged into a still equipped with a fractionating column together with 10 parts by volume of benzene and the mixture was distilled until both the water and the benzene were removed as an azeotropic distillate boiling at about 71° C., i. e., materially below the boiling point of the piperidine. The still residue, constituted of piperidine of about 96.7 per cent purity containing 2.6 per cent by weight of pyridine and .5 per cent of aliphatic amines calculated as amylamine as impurities, represented a yield of about 87 per cent of the piperidine present in the original piperidine-pyridine mixture.

Thus it will be seen that the invention provides a process for the separation of piperidine from pyridine by azeotropic distillation in the presence of water so that piperidine containing only a few per cent of pyridine is removed as distillate leaving most of the pyridine as residue. Good yields of piperidine are obtained and high boiling impurities remain in the residue and do not contaminate the piperidine-containing distillate.

Since certain charges may be made without departing from the scope of the invention, it is intended that the above shall be interpreted as illustrative and not in a limiting sense.

What is claimed is:

1. A process of treating a mixture containing piperidine and pyridine which comprises distilling said mixture in the presence of water, whereby an azeotropic distillate containing a substantial amount of water and a different ration of piperidine to pyridine from that present in said mixture is obtained.

2. A process of treating mixtures containing piperidine and pyridine which comprises distilling the mixture in the presence of water, whereby a mixture of water, piperidine and pyridine is removed as distillate leaving a residue, said distillate containing a higher ratio of piperidine to pyridine and said residue containing a higher ratio of pyridine to piperidine than is present in said first named mixture.

3. A process of separating piperidine from pyridine which comprises fractionating vapors evolved from a mixture containing piperidine and pyridine in a weight ratio of between 6 and 12 to 1 in the presence of water whereby piperidine is preferentially removed from said mixture as a component of an aqueous azeotropic distillate and pyridine is preferentially left as residue.

4. A process of treating mixtures containing piperidine and pyridine which comprises distilling the mixture in the presence of water, whereby a mixture of water, piperidine and pyridine is removed as distillate leaving a residue, said distillate containing a higher ratio of piperidine to pyridine and said residue containing a higher ratio of pyridine to piperidine than is present in said first named mixture, and dehydrating said distillate.

5. A process of separating piperidine from pyridine which comprises distilling a mixture containing piperidine and pyridine in a weight ratio of between 6 and 12 to 1 in the presence of water whereby an aqueous azeotropic distillate containing a greater ratio of piperidine to pyridine than is present in said mixture is formed, said azeotropic distillate containing more than 95 parts by weight of piperidene to each 5 parts of pyridine and boiling below the boiling point of piperidine, and distilling said distillate in the presence of an azeotropic agent which forms with water an azeotropic mixture boiling below the boiling point of piperidine whereby water is removed from said distillate.

6. A process of separating piperidine from pyridine which comprises distilling a mixture containing piperidine and pyridine in a weight ratio of between 6 and 12 to 1 in the presence of water whereby an aqueous azeotropic distillate containing a greater ratio of piperidine to pyridine than is present in said mixture is formed, said azeotropic distillate containing more than 95 parts by weight of piperidine to each 5 parts of pyridine and boiling below the boiling point of piperidine, and distilling said distillate in the presence of a hydrocarbon which forms with water an azeotropic mixture containing a substantially smaller proportion of piperidine than is present in said distillate, said last named azeotropic mixture boiling materially below the boiling point of piperidine whereby water is preferentially removed from said distillate.

7. A process of separating piperidine from pyridine which comprises distilling a mixture containing piperidine and pyridine in a weight ratio of at least 30:70 in the presence of water, whereby an aqueous azeotropic distillate containing water, piperidine and pyridine is removed as distillate, said distillate containing a higher ratio of piperidine to pyridine than is present in such first named mixture.

8. A process of separating piperidine from pyridine, which comprises non-azeotropically fractionally distilling a mixture containing piperidine and pyridine in a weight ratio of less than 6:1 to obtain a mixture containing at least 85 per cent by weight of piperidine, distilling said last named mixture in the presence of water whereby an aqueous azeotropic distillate containing a greater ratio of piperidine to pyridine than is present in said last mentioned mixture is removed as distillate, said azeotropic distillate containing at least 95 parts by weight of piperidine to each 5 parts of pyridine.

HENRY L. STASSE.

---

CERTIFICATE OF CORRECTION.

Patent No. 2,363,157.　　　　　　　　　　　　　　　　November 21, 1944.

HENRY L. STASSE.

It is hereby certified that error appears in the printed specification of the above numbered patent requiring correction as follows: Page 2, second column, line 57, for the word "charges" read --changes--; line 66, claim 1, for "ration" read --ratio--; and that the said Letters Patent should be read with this correction therein that the same may conform to the record of the case in the Patent Office.

Signed and sealed this 27th day of March, A. D. 1945.

(Seal)

Leslie Frazer

Acting Commissioner of Patents.

ratio of pyridine to piperidine than is present in said first named mixture.

3. A process of separating piperidine from pyridine which comprises fractionating vapors evolved from a mixture containing piperidine and pyridine in a weight ratio of between 6 and 12 to 1 in the presence of water whereby piperidine is preferentially removed from said mixture as a component of an aqueous azeotropic distillate and pyridine is preferentially left as residue.

4. A process of treating mixtures containing piperidine and pyridine which comprises distilling the mixture in the presence of water, whereby a mixture of water, piperidine and pyridine is removed as distillate leaving a residue, said distillate containing a higher ratio of piperidine to pyridine and said residue containing a higher ratio of pyridine to piperidine than is present in said first named mixture, and dehydrating said distillate.

5. A process of separating piperidine from pyridine which comprises distilling a mixture containing piperidine and pyridine in a weight ratio of between 6 and 12 to 1 in the presence of water whereby an aqueous azeotropic distillate containing a greater ratio of piperidine to pyridine than is present in said mixture is formed, said azeotropic distillate containing more than 95 parts by weight of piperidene to each 5 parts of pyridine and boiling below the boiling point of piperidine, and distilling said distillate in the presence of an azeotropic agent which forms with water an azeotropic mixture boiling below the boiling point of piperidine whereby water is removed from said distillate.

6. A process of separating piperidine from pyridine which comprises distilling a mixture containing piperidine and pyridine in a weight ratio of between 6 and 12 to 1 in the presence of water whereby an aqueous azeotropic distillate containing a greater ratio of piperidine to pyridine than is present in said mixture is formed, said azeotropic distillate containing more than 95 parts by weight of piperidine to each 5 parts of pyridine and boiling below the boiling point of piperidine, and distilling said distillate in the presence of a hydrocarbon which forms with water an azeotropic mixture containing a substantially smaller proportion of piperidine than is present in said distillate, said last named azeotropic mixture boiling materially below the boiling point of piperidine whereby water is preferentially removed from said distillate.

7. A process of separating piperidine from pyridine which comprises distilling a mixture containing piperidine and pyridine in a weight ratio of at least 30:70 in the presence of water, whereby an aqueous azeotropic distillate containing water, piperidine and pyridine is removed as distillate, said distillate containing a higher ratio of piperidine to pyridine than is present in such first named mixture.

8. A process of separating piperidine from pyridine, which comprises non-azeotropically fractionally distilling a mixture containing piperidine and pyridine in a weight ratio of less than 6:1 to obtain a mixture containing at least 85 per cent by weight of piperidine, distilling said last named mixture in the presence of water whereby an aqueous azeotropic distillate containing a greater ratio of piperidine to pyridine than is present in said last mentioned mixture is removed as distillate, said azeotropic distillate containing at least 95 parts by weight of piperidine to each 5 parts of pyridine.

HENRY L. STASSE.

CERTIFICATE OF CORRECTION.

Patent No. 2,363,157. November 21, 1944.

HENRY L. STASSE.

It is hereby certified that error appears in the printed specification of the above numbered patent requiring correction as follows: Page 2, second column, line 57, for the word "charges" read --changes--; line 66, claim 1, for "ration" read --ratio--; and that the said Letters Patent should be read with this correction therein that the same may conform to the record of the case in the Patent Office.

Signed and sealed this 27th day of March, A. D. 1945.

(Seal)

Leslie Frazer

Acting Commissioner of Patents.